May 24, 1966     O. A. C. VON MYHRE     3,252,612

CERAMIC RECEPTACLE HAVING RUBBER IMPACT LAYER

Filed June 18, 1962

United States Patent Office 3,252,612
Patented May 24, 1966

3,252,612
CERAMIC RECEPTACLE HAVING RUBBER IMPACT LAYER
Otto Albrecht Christian von Myhre, London, England, assignor of forty percent to Thomas C. S. Clarkson, Prestwick, Ayrshire, Scotland
Filed June 18, 1962, Ser. No. 203,357
1 Claim. (Cl. 220—83)

This invention relates to receptacles for holding liquids and in particular to receptacles made of a frangible material such as china, porcelain, earthenware and the like and also glass and brittle synthetic plastics material.

Receptacles made of the above materials are often employed to hold liquids such as beverages and include coffee and teapots, milk and cream jugs and receptacles for other substances used in restaurants and other places. It is desirable to use these frangible materials because of their particular properties in being chemically inert during ordinary use and because they are easily cleaned. However, they suffer from the disadvantage of their inherent tendency to fracture on impact and for this reason it has previously been proposed to coat the receptacle or the exterior thereof with a metallic substance. This usually takes the form of a plating, for example, of nickel, which is subsequently finished in, for example, chromium.

The metallic coating does tend to protect the receptacle from breakage to a certain extent, but nevertheless this is not sufficient for heavy usage where the receptacle may be dropped on to a hard surface. Porcelain and articles made of a like material once they have been chipped or cracked are unserviceable because bacteria cannot readily be removed by ordinary washing techniques and consequently the receptacle has to be destroyed.

It is the main object of this invention to provide a receptacle for holding liquids made of a material referred to which will withstand impact better than hitherto known constructions.

According to the present invention there is provided a receptacle for holding liquids made of a frangible material, including a body portion having an outer protective cover of metal, wherein between the body portion and the outer protective cover there is provided an intermediate layer of impact absorbing material. The impact absorbing material may extend over substantially the entire outer surface of the body portion and the outer protective cover may extend over the entire outer surface of the body portion and partially over the inner surface of the body portion.

Figure 1:
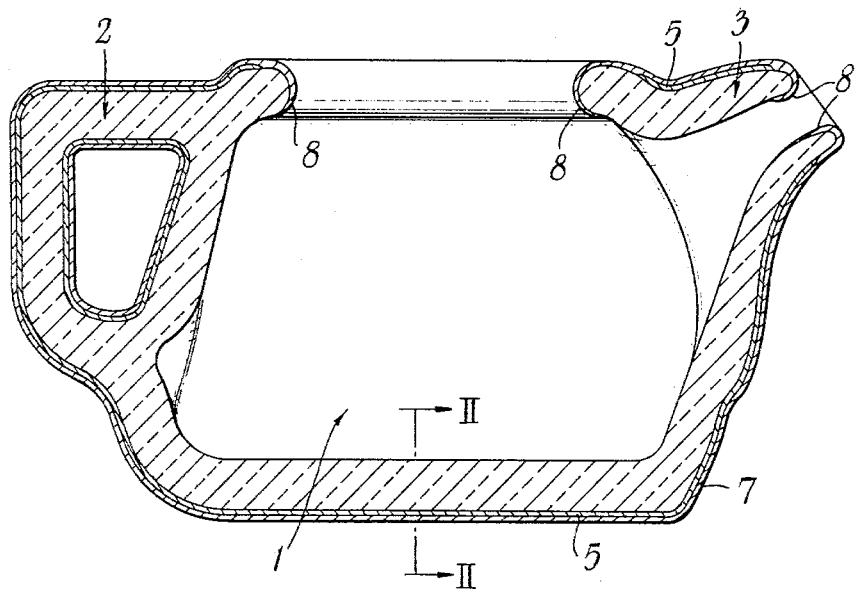
Figure 2:
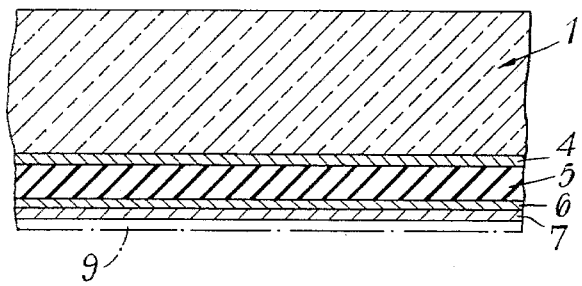

In order that the invention may be readily understood, one embodiment thereof will now be described, by way of example only, and with reference to the accompanying drawing, in which:

FIG. 1 is a cross-sectional view through a receptacle for holding liquids constructed in accordance with the invention; and FIG. 2 is a fragmentary cross-sectional view on the line II—II of FIG. 1.

Referring to the drawing, a receptacle for holding liquids is in the form of a jug having a porcelain body portion 1, an integral handle 2 and a pouring spout 3. The entire surface of the porcelain is then glazed as shown at 4 in FIG. 2 or it may remain unglazed. The whole or a part of the outer surface of the jug may have a silver, bronze or similar conducting paint baked into the glaze and this part of the process covers the entire outer surface of the jug or a part or parts thereof including the handle and pouring spout and extends a short distance inside the jug, although it should be appreciated that this step is not essential to the invention.

The jug is then dipped in a bath of impact absorbing material, preferably rubber, which adheres to the treated surface or, if untreated, to the bare surface of the jug and is allowed to cool thus forming a resilient layer 5. This impact absorbing layer extends over substantially the entire outer surface of the jug as illustrated in FIG. 1. The impact absorbing layer does not extend to the inner surface of the jug so that the glazed porcelain is exposed. This impact absorbing layer may be formed of wax, natural or synthetic rubber or by a synthetic plastics material although rubber is to be preferred. The impact absorbing material is then impregnated with a metallic pigment such as silver, bronze, brass or carbon and is allowed to dry in position. This layer is indicated at 6 in FIG. 2.

The normal finishing processes are finally carried out, namely plating in nickel, copper, zinc, brass or aluminum and form the finishing layer 7 indicated in FIG. 2 and, as will be seen from FIG. 1, this finishing layer extends over the entire outer surface of the jug and also extends slightly to within the jug as indicated at 8. Finally, as an additional finishing process either chromium, silver, brass or gold may be plated over the previously applied metal, dependent upon the appearance the jug is to assume. This additional finishing layer is indicated at 9 in FIG. 2.

Obviously, the covering of impact absorbing material will not extend to within the jug otherwise the contents of the jug may seep into that material. Consequently the impact absorbing material will not extend over the rim of the jug and will be totally enclosed by the plating which does extends over the rim and slightly to within the jug.

The thickness of the impact absorbing layer may be small but gives to the receptacle that slight resistance to shock which prevents breakage in all but the most severe cases. Also, the difference in the coefficients of expansion of the metal and porcelain are taken up by the intervening resilient layer.

It will be appreciated that the technique of utilising an impact absorbing layer may also be applied to lids and covers of receptacles and in certain cases more than one such layer may be provided. Also, the intermediate layer of an impact absorbing material may be associated with a further intermediate layer of asbestos which may be painted in liquid form or may be as a woven sheet applied to the outer surface of the jug.

I claim:

A ceramic receptacle having an impact absorbing layer of rubber covering substantially the entire outer surface of said receptacle and a protective metal layer covering the entire surface of said rubber layer and extending over the lip and at least partially over the inner surface of said receptacle.

References Cited by the Examiner
UNITED STATES PATENTS

| 2,424,583 | 7/1947 | Rahm | 204—20 |
|---|---|---|---|
| 2,548,454 | 4/1951 | Turner | 204—20 |
| 2,732,020 | 1/1956 | Scholl | 204—20 |
| 2,977,014 | 3/1961 | Kock | 206—46 X |
| 3,084,824 | 4/1963 | Kuzma et al. | 206—46 X |
| 3,097,668 | 7/1963 | Langer | 204—20 |

ALLEN B. CURTIS, *Primary Examiner.*

JOHN R. SPECK, JOHN H. MACK, *Examiners.*